United States Patent
Stojcic et al.

(10) Patent No.: US 7,187,562 B2
(45) Date of Patent: Mar. 6, 2007

(54) TWO STAGE POWER CONVERSION CIRCUIT

(75) Inventors: Goran Stojcic, Redondo Beach, CA (US); Weidong Fan, Torrance, CA (US); Carl E. Smith, Torrance, CA (US); Edgar Abdoulin, Woodland Hills, CA (US)

(73) Assignee: International Rectifier Corporation, El Segundo, CA (US)

( * ) Notice: Subject to any disclaimer, the term of this patent is extended or adjusted under 35 U.S.C. 154(b) by 88 days.

(21) Appl. No.: 10/705,460

(22) Filed: Nov. 10, 2003

(65) Prior Publication Data

US 2004/0184294 A1 Sep. 23, 2004

Related U.S. Application Data

(60) Provisional application No. 60/477,311, filed on Jun. 9, 2003, provisional application No. 60/447,635, filed on Feb. 14, 2003, provisional application No. 60/436,316, filed on Dec. 23, 2002, provisional application No. 60/425,422, filed on Nov. 11, 2002.

(51) Int. Cl.
*H02M 3/335* (2006.01)

(52) U.S. Cl. .................................... 363/17
(58) Field of Classification Search ............. 363/17, 363/98, 132, 144; 307/31, 82
See application file for complete search history.

(56) References Cited

U.S. PATENT DOCUMENTS

| | | | |
|---|---|---|---|
| 5,237,606 A | 8/1993 | Ziermann | |
| 5,266,838 A * | 11/1993 | Gerner | 307/19 |
| 5,477,091 A * | 12/1995 | Fiorina et al. | 307/66 |
| 5,500,791 A | 3/1996 | Kheraluwala et al. | |
| 5,552,695 A | 9/1996 | Schwartz | |
| 5,576,940 A | 11/1996 | Steigerwald et al. | |
| 6,239,994 B1 | 5/2001 | Abdoulin | |
| 6,288,916 B1 * | 9/2001 | Liu et al. | 363/37 |
| 6,570,389 B2 | 5/2003 | Singh et al. | |
| 6,642,630 B2 | 11/2003 | Watanabe | |
| 6,650,552 B2 * | 11/2003 | Takagi et al. | 363/17 |
| 6,788,033 B2 | 9/2004 | Vinciarelli | |
| 2003/0142513 A1 | 7/2003 | Vinciarelli | |
| 2004/0090219 A1 | 5/2004 | Chapuis | |

* cited by examiner

*Primary Examiner*—Adolf Berhane
(74) *Attorney, Agent, or Firm*—Ostrolenk, Faber, Gerb & Soffen, LLP

(57) ABSTRACT

A power conversion circuit is provided. The circuit includes an isolated board mounted power module operable to convert a nominal input voltage into an intermediate bus voltage; the board mounted power module being unregulated and controlled in an open-loop; and a plurality of tightly regulated point-of-load converters operable to convert the intermediate bus voltage into respective point-of-load voltages to power a respective number of loads.

25 Claims, 10 Drawing Sheets

Traditional on-board power distribution

Output Voltage Waveform During Hiccup Mode At Current Limit Setting of 21A, Current Load Setting 22A, Current Load Setting 22A And Input Volatge 48V

TWO STAGE POWER CONVERSION CIRCUIT

CROSS-REFERENCE

The present application is based upon and claims priority of U.S. Provisional Applications 60/425,422; 60/436,316; 60/447,635; and 60/477,311 filed respectively on Nov. 11, 2002, Dec. 23, 2002, Feb. 14, 2003 and Jun. 9, 2003 (IR-2412 PROV, IR-2412 PROV II, IR-2412 PROV III and IR-2412 PROV IV, respectively), the disclosures of which are incorporated by reference herein.

FIELD OF THE INVENTION

The present invention relates to power conversion circuits, for example, two-stage power conversion circuits used in networking and communications applications.

BACKGROUND INFORMATION

In today'information age, networking and communications applications are increasingly hungry for information bandwidth. With increased demand for bandwidth comes ever increasing requirements on Quality of Service (QoS) to better guarantee the integrity of data and to maximize system up-time. For this purpose, intelligent routing management is often employed. For example, in packet distribution routing, data streams are reorganized into small packets of data, each of which is routed through separate data paths en route to the final destination, where the packets are ultimately reconstructed into the original data streams. Such routing can only be achieved via complex deep packet processing, which requires ever faster and more powerful NPUs & ASICs.

The increased demands on data processing have, not surprisingly, impacted the design of internal hardware design, especially in the area of on-board power distribution. Since the standard size of a communications board remains relatively constant, power distribution systems must be implemented in an ever decreasing space, as future designs require more and more processors to be added to the board. At the same time, the increase in component count invariably increases power consumption. To fit a power supply into a smaller space and to satisfy the increased demands for power, power distribution design should be optimized to ensure efficiency. Designing more efficient power supplies creates less dissipation and therefore less heat.

Many of today'networking and communications systems employ a power architecture that receives a 48V nominal input from a bulk AC/DC rectifier module. The 48V input is a nominal input, but various systems will accept a power input within a range on either side of nominal. For instance, the universal telecom voltage range is from 36Vin to 75Vin, and the ETSI (European Telecom Standard Input) voltage range is from 36V to 60V. Other systems operate from a regulated 48V bus +/−10%. Regardless of which power distribution method is employed, the input voltage should be distributed to the point-of-load in the most electrically efficient and cost effective way possible.

To meet these more demanding requirements, two-stage power conversion is becoming the new standard for on-board power delivery. Traditionally, multiple isolated power converters $105a, \ldots, 105n-1, 105n$ called "bricks" were used to power various low voltage loads on a board, such as a computer motherboard, as shown in FIG. 1. Lower current peripheral outputs were supplied by converting the intermediate power produced by one of these "bricks" via POLs $110a \ldots 110n$.

Then, in an effort to increase the simplicity and flexibility of on-board power distribution design, fully regulated converter were used to generate intermediate bus voltages, which were then convened to point-of-load voltages via point-of-load power converters (POLs). For example, in one scheme (not shown), a −48Vin nominal input is converted into a 3.3 volt intermediate bus voltage using a single isolated converter. This intermediate bus voltage is supplied directly to the most power-hungry loads on the board, while less power-hungry loads receive power via respective POL converters. In order to maximize throughput efficiency and minimize cost of either two-stage scheme, each power conversion stage must be carefully optimized. However, throughput efficiency of these schemes is typically low.

SUMMARY OF THE INVENTION

It is an object of the present invention to overcome the disadvantages of conventional two-stage power distribution schemes by providing a cost and space efficient power distribution design that employs less components, while at the same time satisfying the ever increasing power demands of many of today's applications. For this purpose, an exemplary embodiment of the present invention takes advantage of the fact that it is not necessary for the isolated converter to precisely control the intermediate bus voltage when using tightly regulated POL converters. Rather, effective performance can be achieved by running the converter open-loop in an unregulated fashion.

By running the isolated DC bus converter open-loop in an unregulated fashion with a 50% duty cycle, the control and circuit design required to control such power conversion becomes very simple and highly efficient, since open-loop design does not require the complex closed-loop control and overvoltage protection circuitry of traditional tightly regulated power conversion designs. Accordingly, such control circuitry may be implemented in single integrated circuits in small spaces. Power conversion performance is achieved using minimized voltage and current stresses, which allow for more efficient power MOSFETs with lower Figures of Merit (FOMs). Furthermore, the fixed 50% duty cycle improves reliability by allowing the use of a simple, highly efficient self-driven secondary synchronous rectification circuit, while minimizing the need for input and output filtering.

To control the simple and novel open-loop control scheme introduced herein, two exemplary integrated circuit controllers are presented, one for half-bridge converters and one for full-bridge converters. An exemplary half-bridge converter according to the present invention may be used to convert nominal input power supplies in a specified range, for example, in the range 60–160 W, whereas a full-bridge converter according to the present invention can convert nominal power inputs in the range of, for example, 120–160 W. Due to fixed 50% duty cycle, the output voltage is proportional to the nominal input voltage by a factor K. With respect to the half-bridge converters according to the present invention, K may equal, for example, ½ divided by the transformer turns ratio. With respect to the full bridge converters according to the present invention, K may equal, for example, 1 divided by the transformer turns ratio. Therefore, full-bridge topologies provide more flexibility with respect to output voltage selection.

DETAILED DESCRIPTION

Figure 1:
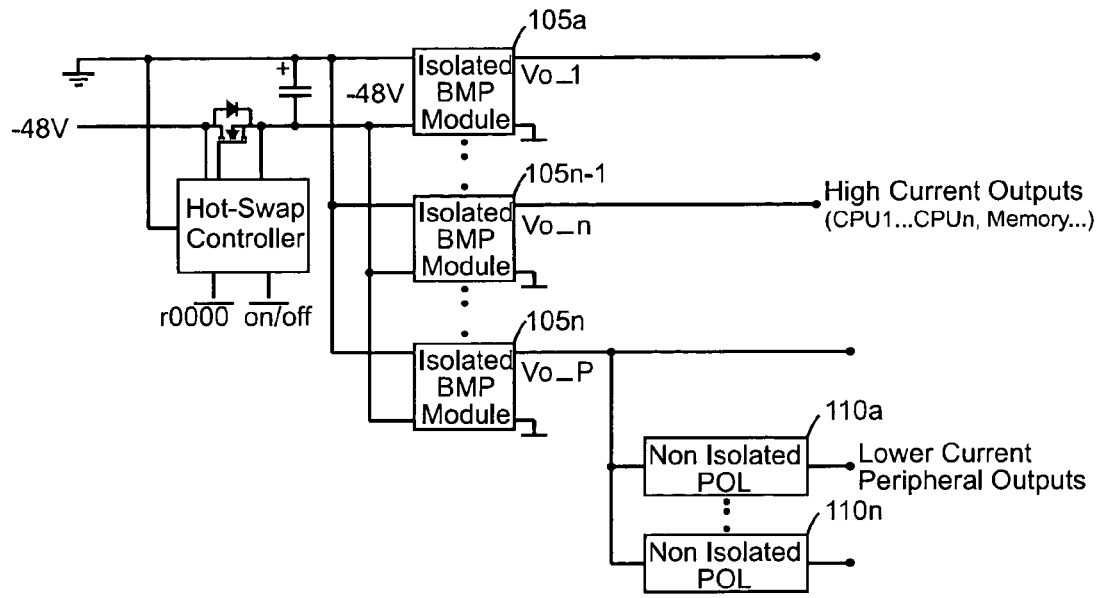
FIG. 1 is a block diagram showing a conventional two-stage power conversion architecture.
Figure 2:
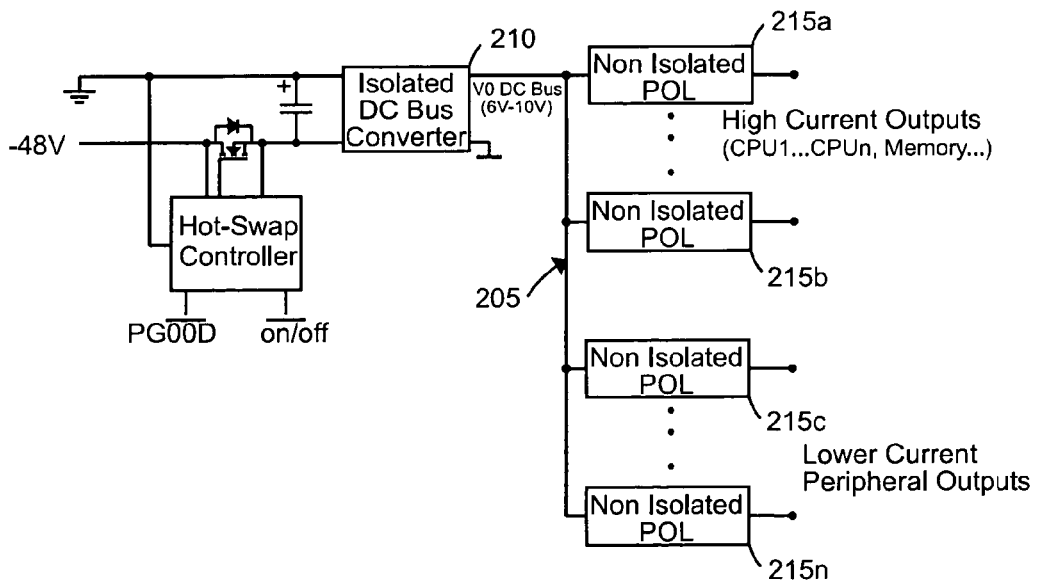
FIG. 2 is a block diagram showing a basic two-stage power conversion architecture according to the present invention.

In a basic scheme according to an embodiment of the invention, as illustrated in FIG. 2 nominal −48V is converted into a 12V intermediate bus voltage 205 via a single isolated converter 210. The intermediate bus voltage 205 is then converted to various point-of-load voltages via respective POLs 215a, 215b, 215c..., 215n.

Figure 3:
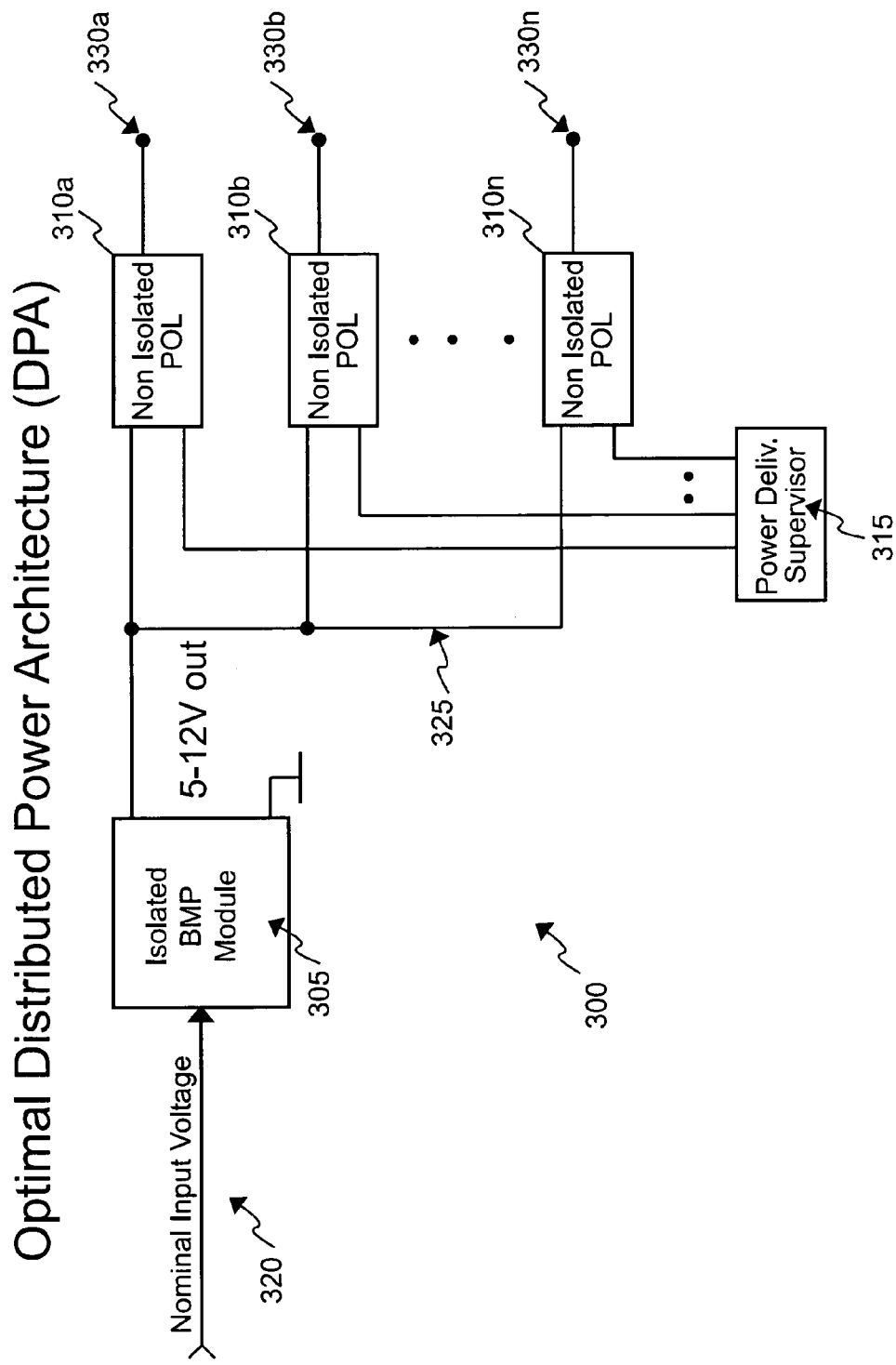
FIG. 3 is a block diagram showing a first exemplary power conversion architecture according to the present invention.

Referring now to FIG. 3, there is seen a first exemplary half-bridge 2-stage power conversion architecture 300 according to the present invention. Power conversion architecture 300 includes a single isolated unregulated Board Mounted Power Module (BMP) 305 operated in open-loop. BMP 305 is operable to convert a nominal input voltage 320 into an intermediate bus voltage 325. The intermediate bus voltage 325 is then fed to various Point-Of-Load (POL) converters 110a, 310b..., 310n, which convert the intermediate bus voltage 325 into respective point-of-load voltages 330a, 330b..., 330n for powering various loads (not shown) on the board.

Figure 4:
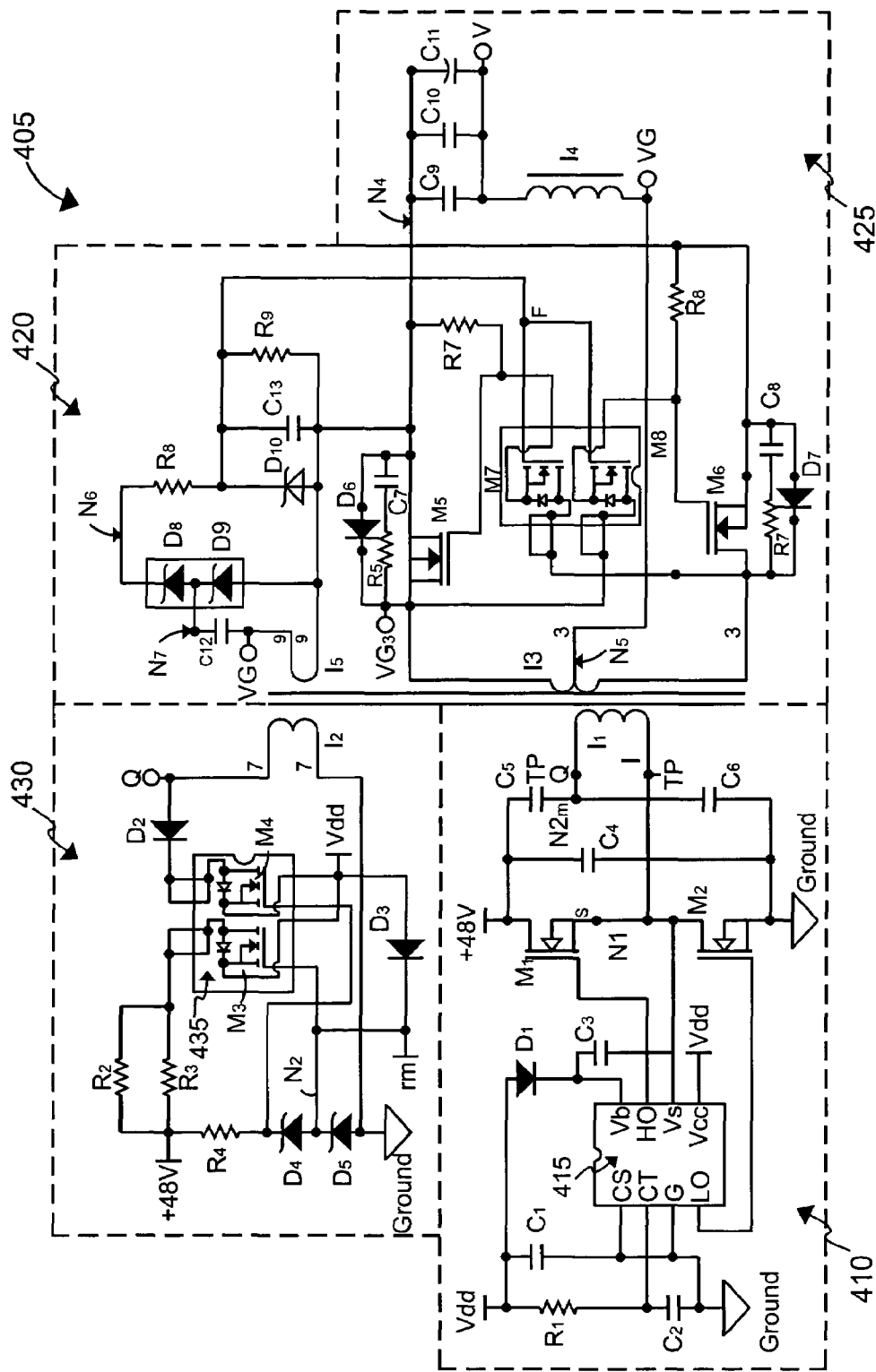
FIG. 4 is an exemplary power conversion circuit for a board mounted power module according to the present invention.

Referring now to FIG. 4, there is seen an exemplary half-bridge converter circuit 405 for use in the BMP power module 305 of FIG. 3. Half-bridge converter circuit 405 includes a primary open-loop inversion circuit 410, a primary bias circuit 430, a secondary rectification and filtering circuit 425, and a secondary bias circuit 420.

Primary open-loop inversion circuit 410 includes a primary half-bridge controller IC 415 having terminals (CS), (CT), (G), (LO), (Vb), (HO), (Vs), and (Vcc). A diode D1 is connected between Vdd and terminal (Vb) of the controller IC 415; a resistor R1 is connected between Vdd and terminal (CT) of controller IC 415; a capacitor C1 is connected between Vdd and terminals (CS), (G) of controller IC 415; a capacitor C2 is connected between terminal (CT) of controller IC 415 and ground, which is also connected to terminals (CS), (G) of controller IC 415; a capacitor C3 is connected between terminals (Vb), (Vs) of controller IC 415; and terminal (Vcc) is connected to Vdd. Primary open-loop inversion circuit 410 also includes power MOSFETS M1, M2 (e.g., two IRF6603 30V n-channel DirectFET power MOSFETS, with the gate drive voltage being clamped to a bias voltage, such as 7.5 volts) connected to one another at node N1 in a half-bridge configuration between the 48 volt nominal input 320 and ground. Node N1 is also connected to terminal (Vs) of controller IC 415. The gates of MOSFETS M1, M2 are connected to terminals (HO), (LO), respectively. Series connected capacitors C5 and C6 and capacitor C4 are connected in parallel with half bridge MOSFETS M1, M2 between 48 volt nominal input 320 and ground. Primary winding I1 is connected between node N2 and terminal (Vs) of controller IC 415.

MOSFET selection is critical in meeting the electrical & thermal efficiency requirements to maintain a small overall solution footprint, while also maintaining minimum component count. Power MOSFETS M1, M2 may include next generation MOSFET technology and may be configured in a half-bridge configuration to work with half-bridge controller IC 415. DirectFET packaging may also be employed to virtually eliminate packaging resistance, thereby allowing for a low overall on-state resistance. Furthermore, since DirectFET technology employs plastic packaging, Direct-FET MOSTFETS are very efficient when top-side cooling is employed. Primary bias circuit 430 includes a dual FET package 435 (e.g., IRF7380 n-channel FETs) containing primary bias MOSFETS M3, M4; resistors R2, R3 connected in parallel between the 48 volt nominal input 320 and MOSFET M3; resistor R4 connected between the 48 volt nominal input 320 and MOSFET M4; series connected zener diodes D4, D5 connected between resistor R4 and ground; a diode D3 connected between node N3 and Vdd; a diode D2 connected to MOSFET M4; and a primary bias winding I2 connected between diode D2 and ground. In this manner, the primary side bias is obtained through a linear regulator on start-up, and then from a transformer in steady state.

Secondary rectification and filtering circuit 425 includes a secondary winding I3 magnetically coupled with primary winding I1 of primary open-loop inversion circuit 410. Secondary winding I3 is connected between MOSFETS M5, M6, which are coupled to one another at node N4. Resistor R5 and capacitor C7 are coupled to one another in parallel with diode d6, which is connected in parallel with the source and drain terminals of MOSFET M5. Similarly, resistor R6 and capacitor C8 are coupled to one another in parallel with diode D7, which is connected in parallel with the source and drain terminals of MOSFET M6. The gate nodes of M5, M6 are each connected to node N4 through respective resistors R7, R8. Inductor coil I4 is connected to center tap node N5, and capacitors C9, C10, C11 are connected in parallel to one another between inductor coil 14 and node N4. Secondary rectification and filtering circuit 425 is also provided with two secondary MOSFETS M7, M8. The gate nodes of MOSFETS M7, M8 are connected to one another. The source nodes of MOSFETS M7, M8 are connected to the gate nodes of MOSFETS M5, M6, respectively, and the drain nodes of MOSFETS M7, M8 are connected to the drain nodes of MOSFETS M6, M5, respectively. Secondary side MOSFETs M7, M8 may be implemented, for example using the IRF6603 DirectFET MOSFETs, configured in a self-driven synchronous rectification topology.

Secondary bias circuit 420 includes a secondary bias winding I5 magnetically coupled to primary bias winding I2 of primary bias circuit 430. Diodes D8, D9 are connected to one another in series between node N4 and node N6; a capacitor C12 is connected to node N7; bias winding I5 is connected between capacitor C12 and node N4; a resistor R8 is connected in series with zener diode D10 between nodes N6 and N4; and a capacitor C13 and resistor R9 are connected in parallel between node N4 and the gates of MOSFETS M7, M8. In this manner, secondary bias circuit 420 is designed to allow outputs of two bus converters to be connected in parallel, each of which is operating at different nominal input voltages. Thus, secondary bias circuit 420 permits half-bridge converter circuit 405 to continue operating, even if one of the two bus converters fails.

Figure 7:
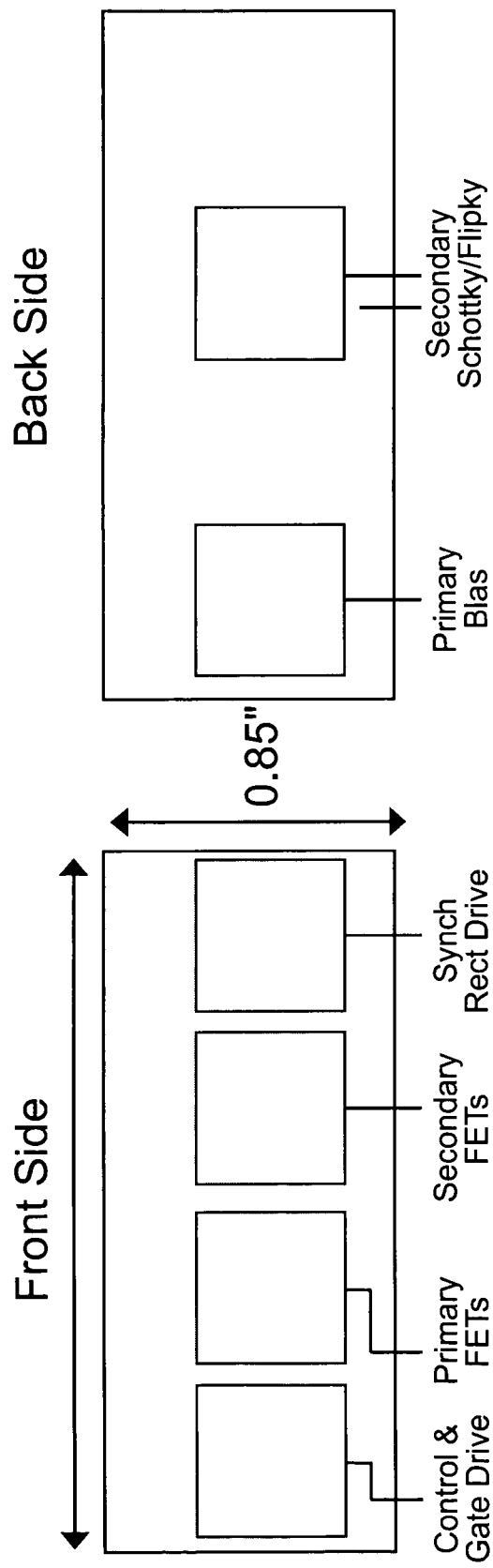
FIG. 7 is an illustration of the front and back of an exemplary power conversion board according to the present invention.
Figure 8:
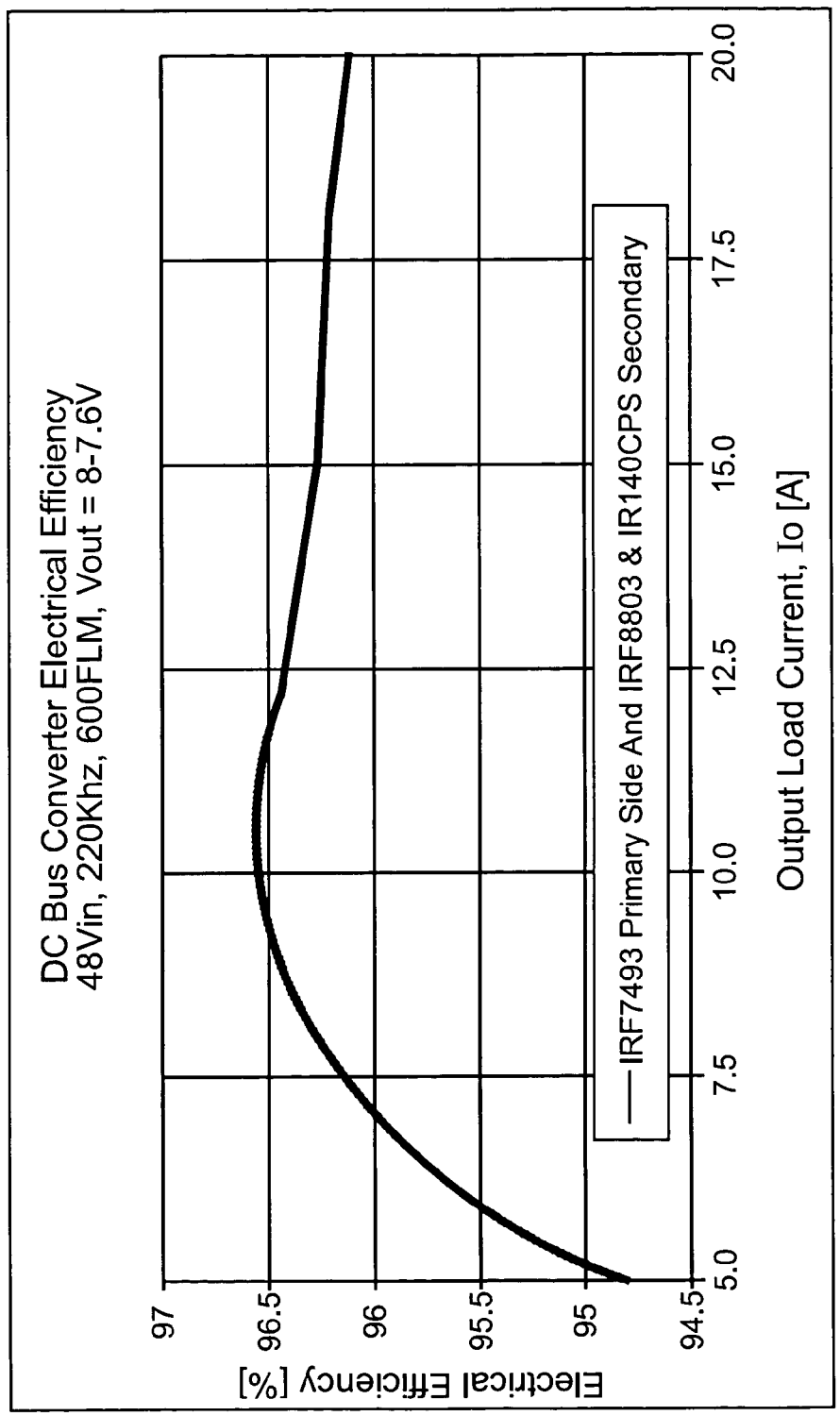
FIG. 8 is a graph showing power conversion efficiency versus output load current.

Referring now to FIG. 7, there is seen front and back sides of an exemplary power board 705 according to the present invention. The power board can deliver 150 W at 8V output voltage with over 96% efficiency in a ⅛ converter BMP outline. This is a 3–5% higher efficiency and 50% smaller size than conventional, fully regulated, board mounted power converters. To minimize printed circuit board (PCB) power losses, power board 705 may have a multi-layer PCB board construction, such as an 8-layer PCB board construction. The top and for example 4 oz of copper. Power board 705 may also include a transformer having flat PQ cores, which provide voltage conversion and isolation between the primary open-loop inversion circuit 410 and the secondary rectification and filtering circuit 425. The magnetic core for the transformer may be selected in accordance with the maximum input voltage and frequency. FR3 material may be used for its low losses at high frequency. A very small air gap in the transformer may be provided to decrease turn-off time of the primary side MOSFETs M1, M2 during light loads. A small 160 nH output inductor with an air gap of 1 millimeter may be used to limit output and input current ripple to below four amperes.

Half-bridge controller IC 415 is operable to provide high-side and low-side drive signals for primary driver MOSFETS M1, M2 with a 50% duty cycle and a minimum number of external components. The gate drive capability of half-bridge controller IC 415 is optimized to drive new generation power MOSFETS M1, M2 directly, without any additional drivers or buffers. The high side nominal input voltage 320 can be as high as, for example, 100V, even though the exemplary circuit of FIG. 4 is implemented using a 48V nominal input voltage. This architecture, therefore, permits a wide nominal input voltage range, e.g., between 24V and 48V, for telecom, networking and computing applications. Furthermore, the primary side bias voltage can range from, for example, 10–15V to further optimize circuit performance.

The pulse width difference between the high-side and low-side drive signals should be less than a predetermined threshold, e.g., less than 25 ns, to prevent magnetic flux imbalance, which may be a concern in certain applications. The switching frequency and dead time between the high-side and low-side drive signals can be changed for different applications by adjusting the values of resistor R1 and capacitor C2. The switching frequency is determined by the following formula:

$$f_s = \frac{1}{2R_1C_2}$$

Figure 5:
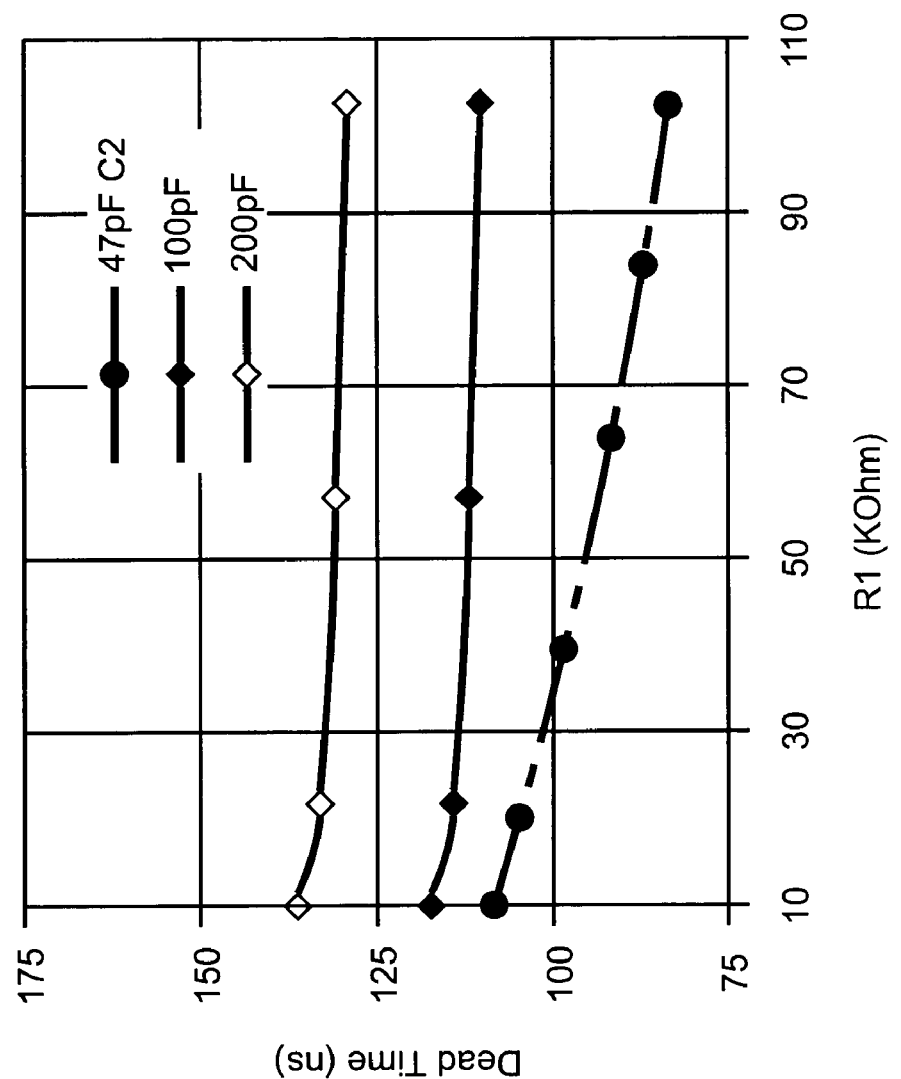
FIG. 5 is a graph showing dead-time of a half-bridge driver IC according to the present invention.

The external resistor R1 and capacitor C2 also determine the dead time between the high-side and low-side drive signals. Referring now to FIG. 5, there is seen a chart showing the relationship between the value of resistor R1 and dead-time, given a particular capacitance value of capacitor C2. The dead time should be longer than the turn-off time of the primary side MOSFETS M1, M2 to prevent shoot through current. The turn-off time of the primary power MOSFETS can be estimated by the following formula:

$$t_{off} = \frac{Q_{gd} + Q_{gs2}}{I_g}$$

where Qgd is the MOSFET gate-to-drain charge (i.e., the "Miller" charge), Qgs2 is the post-threshold gate charge, and Ig is the driver current.

During the dead-time, the body diodes of secondary MOSFETS M7, M8 conduct. Therefore, the dead-time should be set as short as possible to maximize efficiency, while still providing enough time for primary side MOSFETS M1, M2 to turn off under worst case operating conditions.

Figure 6:
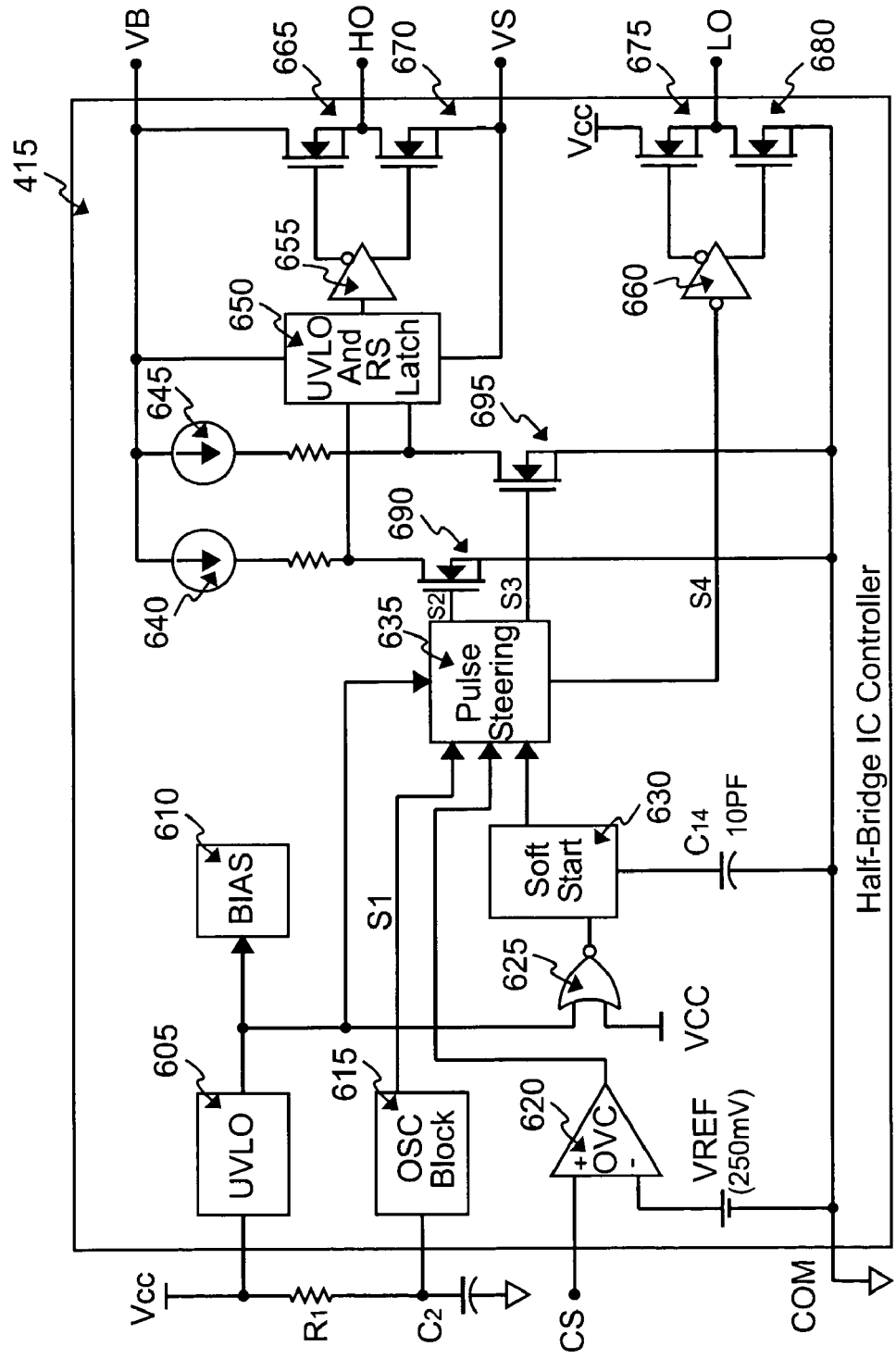
FIG. 6 is a block diagram of the half-bridge driver IC of FIG. 4.

Referring now to FIG. 6, there is seen further detail of the exemplary half-bridge controller IC 415 of FIG. 4. The entire controller IC 415 operates on a bias voltage (e.g., 10 to 15 volts) produced by biasing block 610. Half-bridge controller IC 415 includes under-voltage lock-out (UVLO) blocks 605, 650 assigned to Vcc and Vb, respectively. The undervoltage lookout function ensures that all timing signals are kept within specifications. Oscillator block 615 provides a 555-like signal S1 having a 50% duty cycle. An internal soft-start block 630 ensures that the duty cycle of signals S2, S3, S4 increase gradually from zero to 50%, thereby easing in-rush current during start-up. High-side and low-side drivers 655, 660 are capable of providing, for example, one ampere of current on high-side and low-side driver signals (HO), (LO) via MOSFETS 665, 670, 675, 680. Half-bridge controller IC 415 also includes a current limiting function via current sources 640, 645 and MOSFETS 690, 695.

As described above, half-bridge controller IC 415 may be used to control unregulated isolated DC bus converters operated in open-loop, for example, DC bus converters used in 48V two-stage on-board power distribution systems. Half-bridge controller IC 415 is optimized for performance, simplicity, and cost, the entire controller IC 415 capable of being integrated into a single package, such as a single S08 package.

Figure 9:
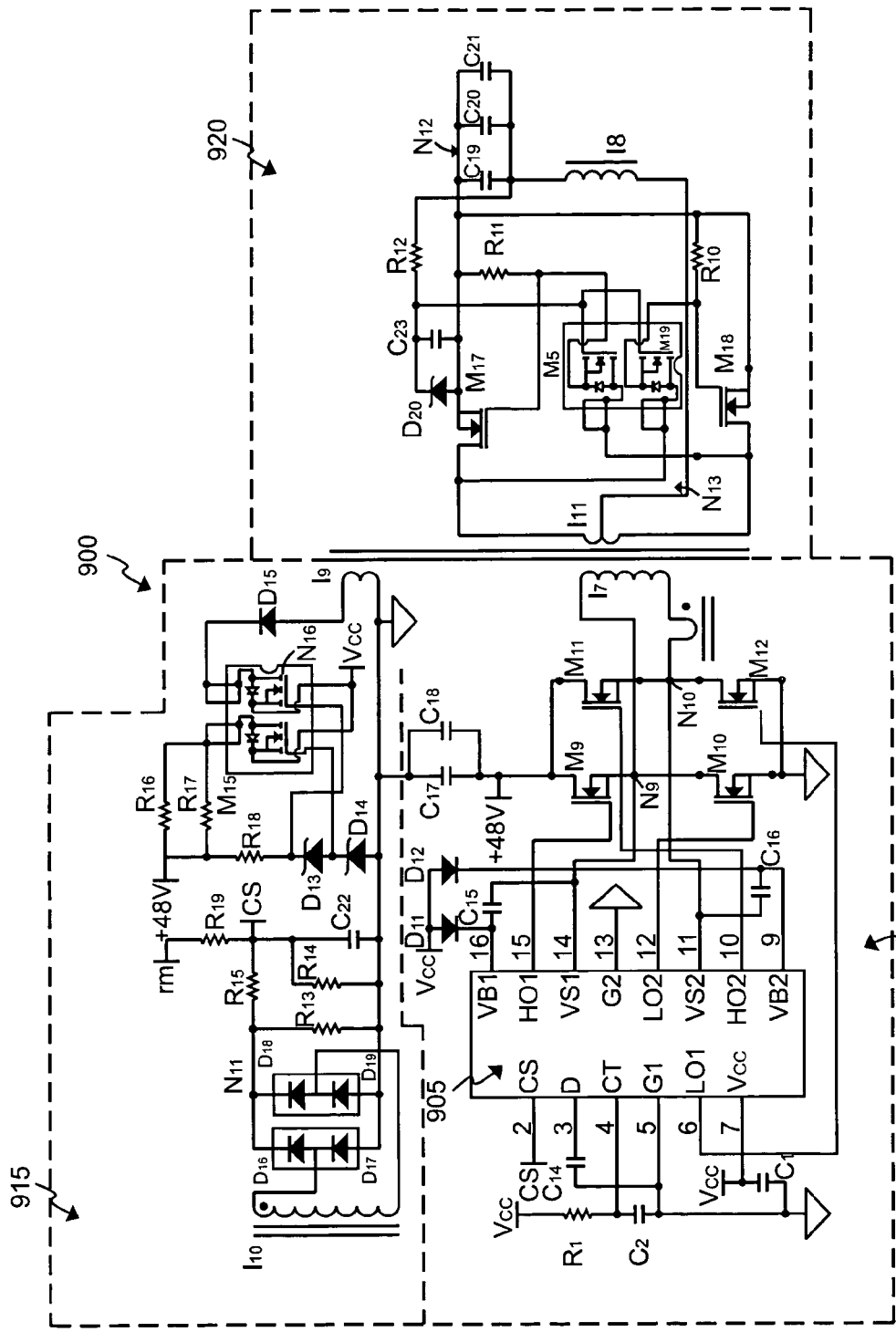
FIG. 9 is another exemplary power conversion circuit for a board mounted power module according to the present invention.

Referring now to FIG. 9, there is seen an exemplary full-bridge converter circuit 900 for use in the BMP power module 05 of FIG. 3. Full-bridge converter circuit 900 includes a primary open-loop inversion circuit 910, a primary bias circuit 915, and a secondary rectification and filtering circuit 425.

Primary open-loop inversion circuit 910 includes a primary full-bridge controller IC 905 having terminals (CS), (D), (CT), (G1), (LO1), (Vcc), (VB1), (HO1), (VS1), (G2), (LO2), (VS2), (HO2), and (VB2). A diode D11 is connected between Vcc and terminal (VB1) of controller IC 905; a diode D12 is connected between Vcc and terminal (VB2) of controller IC 905; a resistor R1 is connected between Vcc and terminal (CT) of controller IC 905; a capacitor C1 is connected between Vcc and terminal (G1) of controller IC 905; a capacitor C2 is connected between terminal (CT) of controller IC 905 and ground; a capacitor C15 is connected between terminals (Vb1), (VS1) of controller IC 905; terminal (Vcc) is connected to Vcc; capacitors C17 and C18 are connected in parallel with each other between the 48 volt nominal input 320 and ground; and a capacitor C16 is connected between terminals (VS2) and (VB2) of controller IC 905. Primary open-loop inversion circuit 905 also includes power MOSFETS M9, M10, M11, M12 (e.g., four IRF6603 30V n-channel DirectFET power MOSFETS). MOSFET M9, M10 and M11, M12 are connected to one another at nodes N9, N10, respectively, in a full-bridge configuration between the 48 volt nominal input 320 and ground. Node N9 is also connected to terminal (VS1) of controller IC 905, and node N10 is also connected to terminal (VS2) of controller IC 905. The gates of MOSFETS M9, M10, M11, M12 are connected to terminals (HO1), (LO1), (HO2), (LO2), respectively. Primary winding I7 is connected between nodes N9 and N10.

Primary bias circuit 915 includes primary bias MOSFETS M15, M16; resistors R16, R17 connected in parallel between the 48 volt nominal input 320 and MOSFET M15; a resistor R18 connected between the 48 volt nominal input 320 and MOSFET M4; series connected zener diodes D13, D14 connected between resistor R18 and ground; a diode D15 connected to MOSFET M16; a primary bias winding I9 connected between diode D15 and ground; a resistor R14 and capacitor C22 connected in parallel to one another between terminal (CS) of controller IC 905 and ground; resistors R15, R13 connected in series at node N11 between terminal (CS) of controller IC 905 and ground; a resistor R19 connected between terminal (CS) of controller IC 905 and (rm); series connected diodes D16, D17 connected between node N11 and ground; series connected diodes D18, D19 connected between node N11 and ground; and a coil I10 connected between series connected diodes D16, D17 and D18, D19.

Secondary rectification and filtering circuit 920 includes a secondary winding I11 magnetically coupled with primary winding I7 of primary open-loop inversion circuit 910. Secondary winding I11 is connected between MOSFETS M17, M18, which are coupled to one another at node N12. The gate nodes of MOSFETS M17, M18 are each connected to node N12 through respective resistors R11, R10. Inductor coil I8 is connected to center tap node N13, and capacitors C19, C20, C21 are connected in parallel to one another between inductor coil I8 and node N12. Secondary rectification and filtering circuit 425 is also provided with two secondary MOSFETS M13, M14. The gate nodes of MOSFETS M13, M14 are connected to one another. Zener diode D20 and capacitor C23 are connected in parallel with one another between the gate nodes of MOSFETS M13, M14 and node N12. A resistor R12 is connected between the gate nodes of MOSFETS M13, M14 and coil I8. The source nodes of MOSFETS M13, M14 are connected to the gate nodes of MOSFETS M17, M18, respectively, and the drain nodes of MOSFETS M13, M14 are connected to the drain nodes of MOSFETS M18, M17, respectively. Secondary side MOSFETs M13, M14 may be implemented, for example, using the IRF6603 DirectFET MOSFETs, configured in a self-driven synchronous rectification topology.

The full-bridge controller and driver IC 905 is similar to the half-bridge controller 415 of FIG. 4, but with an improved current limiting function mode and flexible soft-start capability. The current limiting function has a hiccup mode, in which the hiccup period may be externally controlled by a capacitor. The primary side current is sensed with a current transformer. Having a high turn ratio, e.g., a turn ratio of 150 to 1. The sensed AC current information is rectified and then provided as an input into the current sense pin (CS) of the driver IC 905 after RC filtering.

Since this controller IC 905 is designed for full-bridge circuits, it provides four gate drive signals for MOSFETS M9, M10, M11, M12, respectively. The controller turns on each branch alternatively with a 50% duty cycle. The difference in turn-on periods between the two branches should be less than, for example, 25 ns to prevent magnetic flux imbalance. Turn-on and turn-off timing difference between the two MOSFETS should also be less than 25 ns.

Figure 10:
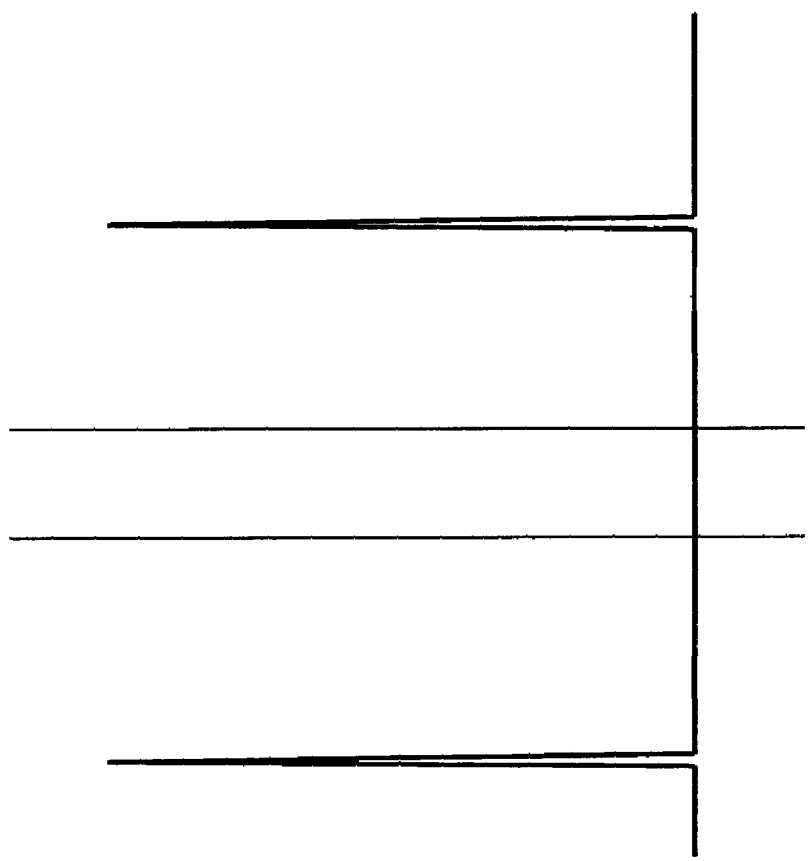
FIG. 10 is a graph showing a hiccup waveform.

Referring now to FIG. 10, there is seen a graph showing an output voltage waveform during a hiccup mode at a current limit setting of 21A, a current load setting of 22A, and a nominal input voltage of 48V. As shown in FIG. 10, controller IC 905 attempts to turn on the converter once in a predetermined period. For example, the predetermined period may be set to, for example, 500 ms, by adjusting the value of capacitor C14.

Figure 11:
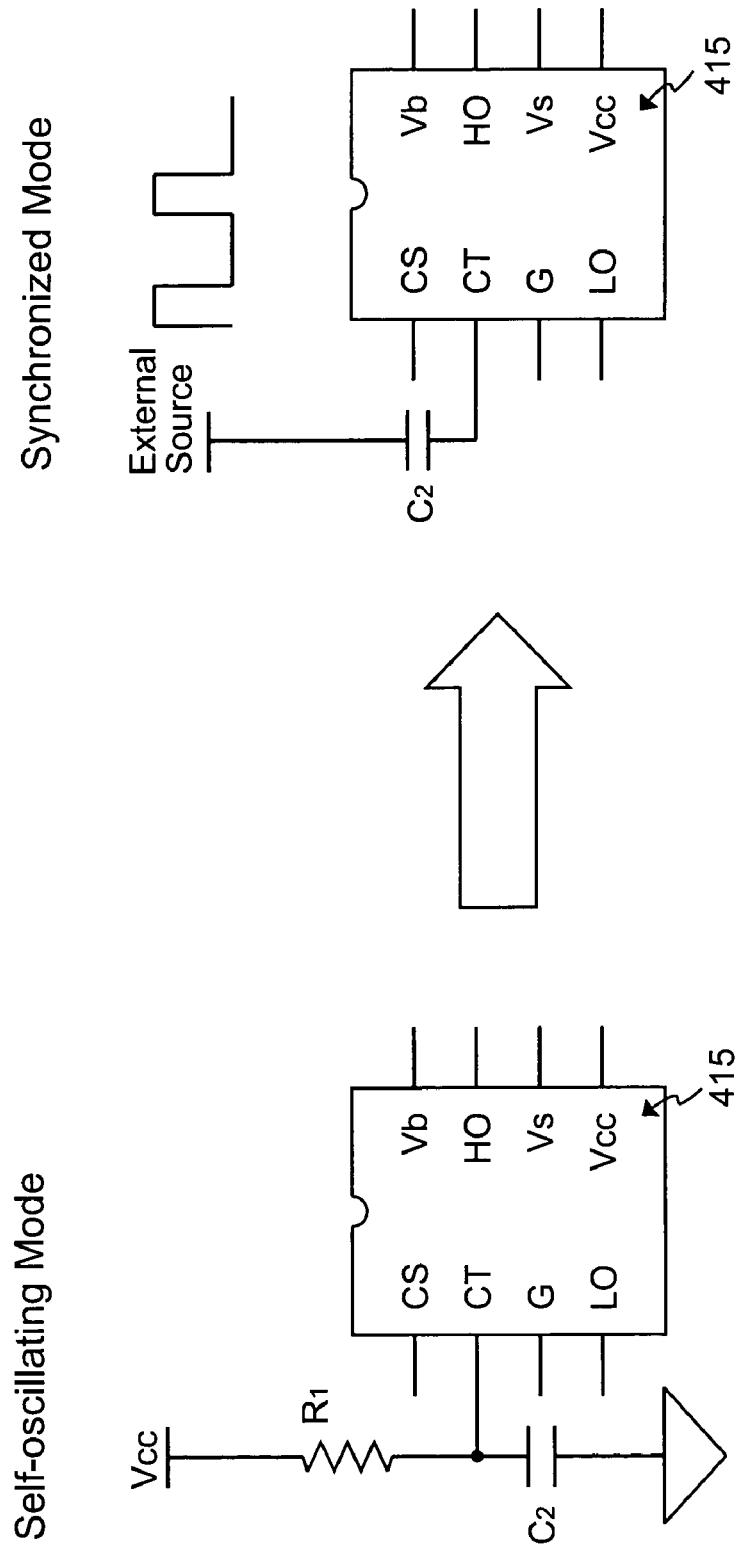
FIG. 11 shows two methods for configuring the half-bridge driver IC of FIG. 4 to run in a self-oscillating mode or a synchronized mode.

Both the half-bridge controller IC 415 and full bridge controller IC 905 are designed to allow easy external synchronization within a ride frequency range. For this purpose, the timing resistor R1 needs to be removed, and the timing capacitor C2 connected between the IC 415, 905 and an external synchronization source, as shown in FIG. 11. In the self oscillating mode, the current through the external timing resistor R1 charges the timing capacitor C2. Whenever the voltage at the (CT) terminal of either IC 415, 905 is higher than a predetermined threshold, e.g., one half of the IC supply voltage Vcc or Vdd, the internal driver of the controller IC 415, 905 begins to discharge the timing capacitor C2. After the voltage at terminal (CT) is lower than a predetermined threshold, for example, one fifth of the supply voltage Vcc or Vdd, controller IC 405, 915 disables the internal driver and stops discharging the timing capacitor C2 so that current through resistor R1 begins to charge capacitor C2 once again.

In the synchronized mode of operation, the external capacitor C2 couples the rising edges of the external synchronization source to the (CT) terminal. Whenever the voltage at terminal (CT) is higher than a predetermined threshold, for example, one-half of the IC supply voltage, the internal driver in controller IC 415, 905 begins to discharge the voltage at terminal (CT). When the voltage at terminal (Ct) is less than a predetermined threshold, for example, one fifth the IC 415, 905 supply voltage, IC 415, 905 disables the driver and stops discharging the timing capacitor C2. When the negative edge is applied, an internal diode resets the voltage at terminal (CT) and keeps the voltage across the external timing capacitor C2 at zero volts. After the voltage across the external timing capacitor C2 reaches zero, capacitor C2 is ready for the next external positive pulse. In the synchronized mode, the dead time is only determined by the internal impedance at terminal (CT) and by the capacitance of external timing capacitor C2.

In self-oscillating mode, the timing resistor R1 cannot be too low, so as to limit the maximum operating frequency. Usually, the timing resistor R1 should be higher than a predetermined value, such as 2 kΩ. The lower the resistance value of resistor RI, the higher the sink current for the internal discharge driver of IC 415, 905. Since timing resistor R1 is removed in synchronous mode, a higher operating frequency may be achieved. The maximum operating frequency in synchronous mode is determined by the power dissipation from driving the external primary side MOSFETS.

What is claimed is:
1. A power conversion circuit, comprising:
   an unregulated isolated board mounted power module operable to convert a nominal input voltage into an intermediate bus voltage, the isolated board mounted power module having at least one pair of MOSFETS connected in series in a bridge configuration across the nominal input voltage, the power module being operated in an open-loops, a primary open-loop inversion circuit having
  a controller IC for driving the at least one pair of MOSFETS, the controller IC being operable to alternatively control the pair of MOSFETS with a 50% duty cycle, and
  a timing resistor and a timing capacitor, wherein a dead-time and a switching frequency of the controller IC being adjustable in accordance with values of the timing resistor and the timing capacitor; and a plurality of tightly regulated point-of-load converters operable to convert the intermediate bus voltage into respective point-of-load voltages to power a respective number of loads.

2. The power conversion circuit of claim 1, wherein the board mounted power module includes
  the primary open-loop inversion circuit,
  a primary bias circuit,
  a secondary synchronous rectification and filtering circuit, and
  a secondary bias circuit magnetically coupled to one another, the synchronous rectification and filtering circuit producing the intermediate bus voltage.

3. The power conversion circuit of claim 2, wherein the controller IC is a half-bridge controller IC for driving the pair of MOSFETS connected in a half-bridge configuration.

4. The power conversion circuit of claim 3, wherein the switching frequency is determined by the formula $$f_s = \frac{1}{2R_1 C_2},$$

where fs is the switching frequency, R1 is the value of the timing resistor, and C2 is the value of the timing capacitor.

5. The power conversion circuit of claim 3, wherein the pair of MOSFETS include DirectFETs.

6. The power conversion circuit of claim 3, wherein the half-bridge controller IC may be run in at least two modes, one of the modes being a self-oscillating mode, another one of the modes being a synchronized mode.

7. The power conversion circuit of claim 2, wherein the controller IC is a full-bridge controller IC and two pairs of MOSFETS connected in a full bridge configuration.

8. The power conversion circuit of claim 7, wherein the primary open-loop inversion circuit includes a timing resistor and a timing capacitor, a dead-time and switching frequency of the full-bridge controller IC being adjustable in accordance with values of the timing resistor and the timing capacitor.

9. The power conversion circuit of claim 8, wherein the switching frequency is determined by the formula $$f_s = \frac{1}{2R_1 C_2},$$

where fs is the switching frequency, R1 is the value of the timing resistor, and C2 is the value of the timing capacitor.

10. The power conversion circuit of claim 7, wherein the two pairs of MOSFETS include DirectFETs.

11. The power conversion circuit of claim 7, wherein the full-bridge controller IC may be run in at least two modes, one of the modes being a self-oscillating mode, another one of the modes being a synchronized mode.

12. The power conversion circuit of claim 3, wherein the switching frequency fs is inversely proportional to R1, the value of the timing resistor, and C2, the value of the timing capacitor.

13. The power conversion circuit of claim 8, wherein the switching frequency fs is inversely proportional to R1, the value of the timing resistor, and C2, the value of the timing capacitor.

14. A half-bridge controller IC for use with a power conversion circuit including an isolated unregulated board mounted power module operable to convert a nominal input voltage into an intermediate bus voltage, the board mounted power module being operated in an open-loop, and a plurality of tightly regulated point-of-load converters operable to convert the intermediate bus voltage into respective point-of-load voltages to power a respective number of loads, the half-bridge controller IC comprising:
  a biasing circuit to produce a bias voltage to operate the half-bridge controller IC;
  under-voltage lock-out circuit operable to monitor a voltage on a power supply pin of the half-bridge controller IC;
  an oscillator circuit to provide a timing signal having a 50% duty cycle;
  a soft-start circuit to ensure that the duty cycle of the timing signal increases gradually from zero to the 50% duty cycle to ease in-rush current during start-up; and
  high-side and low-side drivers to provide MOSFET driving signals to control a pair of MOSFETS connected to one another in series in a half-bridge configuration across the nominal input voltage, the half-bridge controller IC alternatively controlling the MOSFETS with a 50% duty cycle, wherein the unregulated isolated board mounted power module includes
  a primary open-loop inversion circuit,
  a primary bias circuit,
  a secondary rectification and filtering circuit,
  a secondary bias circuit, the primary open-loop inversion circuit being magnetically coupled to the secondary rectification and filtering circuit, the primary bias circuit being magnetically coupled to the secondary bias circuit, the secondary rectification and filtering circuit producing the intermediate bus voltage.

15. The half-bridge controller IC of claim 14, wherein the MOSFETS include a pair of DirectFETs.

16. A power conversion circuit, comprising:
  an unregulated isolated board mounted power module operable to convert a nominal input voltage into an intermediate bus voltage, the isolated board mounted power module being operated in an open-loop, the unregulated isolated board mounted power module including
  a primary open-loop inversion circuit.
  a primary bias circuit,
  a secondary rectification and filtering circuit,
  a secondary bias circuit, the primary open-loop inversion circuit being magnetically
  coupled to the secondary rectification and filtering circuit, the primary bias circuit being
  magnetically coupled to the secondary bias circuit, the secondary rectification and
  filtering circuit producing the intermediate bus voltage, and
  a half-bridge controller IC, the half-bridge controller IC including a biasing circuit to produce a bias voltage to operate the half-bridge controller IC, under-voltage lock-out circuit operable to monitor a voltage on a power supply pin of the half-bridge controller IC, an oscillator circuit to provide a timing signal having a 50% duty cycle, a soft-start circuit to ensure that the duty cycle of the timing signal increases gradually from zero to the 50% duty cycle to ease in-rush current during start-up, and high-side and low-side drivers to provide MOSFET driving signals to control a pair of MOSFETS connected to one another in series in a half-bridge configuration across the nominal input voltage, the half-bridge controller IC alternatively controlling the MOSFETS with a 50% duty cycle; and a plurality of tightly regulated point-of-load converters operable to convert the intermediate bus voltage into respective point-of-load voltages to power a respective number of loads.

17. The power conversion circuit of claim 16, wherein the primary open-loop inversion circuit includes a timing resistor and a timing capacitor, a dead-time and switching frequency of the controller IC being adjustable in accordance with values of the timing resistor and the timing capacitor.

18. The power conversion circuit of claim 17, wherein the switching frequency is determined by the formula $$f_s = \frac{1}{2R_1C_2},$$

where fs is the switching frequency, R1 is the value of the timing resistor, and C2 is the value of the timing capacitor.

19. The power conversion circuit of claim 16, wherein the pair of MOSFETS include DirectFETs.

20. The power conversion circuit of claim 16, wherein the half-bridge controller IC may be run in at least two modes, one of the modes being a self-oscillating mode, another one of the modes being a synchronized mode.

21. The power conversion circuit of claim 17, wherein the switching frequency fs is inversely proportional to R1, the value of the timing resistor, and C2, the value of the timing capacitor.

22. The power conversion circuit of claim 14, wherein the board mounted power module includes a primary open-loop inversion circuit, a primary bias circuit, a secondary rectification and filtering circuit, and a secondary bias circuit, the primary open-loop inversion circuit being magnetically coupled to the secondary rectification and filtering circuit, the primary bias circuit being magnetically coupled to the secondary bias circuit, the secondary rectification and filtering circuit producing the intermediate bus voltage.

23. The power conversion circuit of claim 22, wherein the primary open-loop inversion circuit includes a timing resistor and a timing capacitor, a dead-time and switching frequency of the controller IC being adjustable in accordance with values of the timing resistor and the timing capacitor.

24. The power conversion circuit of claim 23, wherein the switching frequency is determined by the formula $$f_s = \frac{1}{2R_1C_2},$$

where fs is the switching frequency, R1 is the value of the timing resistor, and C2 is the value of the timing capacitor.

25. The power conversion circuit of claim 23, wherein the switching frequency fs is inversely proportional to R1, the value of the timing resistor, and C2, the value of the timing capacitor.

* * * * *